United States Patent [19]

Jackson et al.

[11] Patent Number: 5,359,807

[45] Date of Patent: Nov. 1, 1994

[54] METHOD AND APPARATUS FOR AUTODISSEMINATION OF INSECT PATHOGENS

[75] Inventors: David M. Jackson, Oxford, N.C.; Grayson Brown, Vesailles; Gerald L. Nordin, Danville, both of Ky.

[73] Assignee: The United States of America as represented by the Secretary of Agriculture, Washington, D.C.

[21] Appl. No.: 68,039

[22] Filed: May 28, 1993

[51] Int. Cl.$^5$ ............................................. A01M 1/20
[52] U.S. Cl. ..................................... 43/131; 43/132.1
[58] Field of Search ...................... 43/132.1, 118, 122, 43/131

[56] References Cited

U.S. PATENT DOCUMENTS

| | | | |
|---|---|---|---|
| 1,119,502 | 12/1914 | Evans | 43/131 |
| 2,587,397 | 2/1952 | Smith | 43/131 |
| 4,443,964 | 4/1984 | Horn et al. | 43/118 |
| 4,485,582 | 12/1984 | Morris | 43/131 |
| 4,662,104 | 5/1987 | Mather et al. | 43/132.1 |
| 4,671,010 | 6/1987 | Conlee et al. | 43/114 |
| 4,793,093 | 12/1988 | Gentile | 43/131 |
| 4,835,902 | 6/1989 | Sherman | 43/131 |
| 4,970,822 | 11/1990 | Sherman | 43/131 |
| 5,042,194 | 8/1991 | Cohen | 43/131 |

FOREIGN PATENT DOCUMENTS

733627  7/1955  United Kingdom .................. 43/131

OTHER PUBLICATIONS

Dowd, Patrick F. and Vega, Fernando E.—U.S. Patent Application Ser. No. 08/169,806, Filed Dec. 17, 1993.
Amer. Phytopatho. Soc. 77(2):167–172 (1987). Childress et al., "Bee-Mediated Transmission of Blueberry Leaf Mottle Virus Via Infected Pollen in . . . ".
J. of Plant Diseases and Protection 95(6), 606–610 (1988). Abbas, "Interactions Between Nuclear Polyhedrosis Virus, Host and Predators".
J. Entomol. Sci. 23(4): 394–398 (Oct. 1988). Kring et al., "The Striped Lynx Spider, Oxyopes Salticus Hentz (Araneae: Oxyopidae), as a Vector of . . . ".
Indian J. of Ag. Sciences 58(8): 661–663 (Aug. 1988).

Vyas et al., "Transmission of Nuclear Polyhedrosis Virus of Heliothis Armigera . . . ".
J. Entomol. Sci. 24(4): 500–506 (Oct. 1989). Young et al, "Nuclear Polyhedrosis Virus Transmission by Microplitis Croceipes (Hymenoptera: Braconidae) . . . ".
Environ. Entomology 19(2): 251–256 (1990). Young et al., "Transmission of Nuclear Polyhedrosis, Virus by the Parasitoid Microplitis croceipes . . . ".
J. Entomol. Sci. 20(2): 212–218 (Apr. 1985). Young et al., "Compatibility of Two Fall Armyworm Pathogens with the Predaceous Beetle, Calosoma Sayi . . . ".
Southwestern Entomologist 14(2): 136–146 (1989). Brown et al., "Transmission of Heliothis NPV by Microplitis Croceipes (Cresson) in Heliothis Virescens (F.)".
Entomophaga 32(4): 387–397 (1987). Ali et al., "Transmission of NPV in Uniform- and Mixed-Age Populations of Heliothis Zea (Lep.: Noctuidae) on Cages . . . ".
J. of Invert. Path. 24: 70–81 (1974). Hamm et al., "Mode of Transmission of Nuclear-Polyhedrosis Virus to Progeny of Adult Heliothis zea".
Microbial Control of Entomopathogens: Virus. Allen et al (eds), pp. 46–55 (1978) Gard et al, "Autodissemination of Entomopathogens".

(List continued on next page.)

*Primary Examiner*—P. Austin Bradley
*Assistant Examiner*—Jeanne M. Elpel
*Attorney, Agent, or Firm*—M. Howard Silverstein; John D. Fado; Gail E. Poulos

[57] ABSTRACT

Biocontrol agents are disseminated for the control of pests using a device which directs a flying insect through a biocontrol agent and out of the device. The device provides separate entry and exit openings which allow the surface contaminated insect to ultimately lethally infect the $F_1$ larvae.

11 Claims, 6 Drawing Sheets

OTHER PUBLICATIONS

Entomol. Exp. Appl. 46: 181–186 (1988). Olofsson, "Dispersal of the Nuclear Polyhedrosis Virus of Neodiprion Sertifer from Soil to Pine Foliage w/Dust".

Harstack, A. W., et al., 1979, "Moth Traps for the Tobacco Budworm" J. Econ Entomol. 72:519–522.

Hayes, J. L., et al., "Two Modifications for Increasing Captures in Heliothis Virescens Pheromone-Dispensing Cone Traps" J. Entomol Sci. 24(3):355–360 (Jul. 1989).

Ignoffo, Carlo M., 1978, "Strategies to Increase the Use of Entomopathogens" Journal of Invertebrate Pathology 31. 1–3.

Nordin, Gerald L., et al., 1991, "Transovum Transmission of Two Nuclear Polyhedrosis Viruses by Adult Tobacco . . . " Trans. Ky. Acad. Sci., 52(1–2), 33–39.

Nordin, G. L., et al., "Vertical Transmission of Two Baculoviruses Infectious to the Tobacco Budworm Using an Autodissemination Technique" Journal of the Kansas Entomological Society 63(3), 1990, pp. 393–398.

Jackson, D. Michael, et al., 1992, "Autodissemination of a Baculovirus for Management of Tobacco Budworms on Tobacco" J. Econ. Entomol. 85(3):710–719.

METHOD AND APPARATUS FOR AUTODISSEMINATION OF INSECT PATHOGENS

FIELD OF THE INVENTION

This invention relates to an apparatus that includes a receptacle containing biocontrol agents which are picked up, carried, and disseminated by insects and to a method for using the apparatus.

BACKGROUND OF THE INVENTION

Chemical insecticides are used to control insects that damage agricultural commodities such as tobacco, cotton, and soybeans. However, recent concerns about insecticide residues on commodities resistance of insects to chemical insecticides, hazardous exposure to pesticide applicators, environmental contamination, destruction of natural biocontrol agents and lack of newly developed insecticides have increased the need for alternative control methods. Furthermore, as pests become more resistant, more frequent treatments are required which increases a human health hazard. Alternative control methods must be found so as to minimize these health hazards.

An alternative to chemical insecticides is the use of biological control agents such as pathogens. To date, attempts at using pathogenic biocontrol agents have been directed primarily at using them in microbial insecticide formulations in a manner analogous to chemical insecticides. Some of the problems that have prohibited widespread use of biocontrol agents include formulation and delivery problems, inactivation by physical factors, higher costs from in-vivo production requirements, and reduced efficacy compared with chemical insecticides.

To be effective, biocontrol agents, like conventional pesticides must be critically timed, uniformly distributed, and available in appropriate dosage to the targeted host species. Unlike conventional pesticides, which are generally toxic, many biocontrol agents are host specific or attack a narrow range of hosts. Furthermore, with the declining arsenal of chemical pesticides due to government regulation and the renewed interest in air and ground water quality, there is a need for effective biocontrol agents as well as a means for disseminating the agent. Biocontrol agents can be conveyed into the agroecosystem by a variety of non-conventional methods including autodissemination (Gard and Falcon, In Microbial control of insect pests: Future strategies in pest management systems, pp. 46–54, 1978; Ali et al., Entomophaga 32: 387–398, 1987; Elmore et al., J. of Insect Path. v. 6, 430–438, 1964; Ham et al., J. Invertebr. Path. v. 24, 70–81, 1974), predators (Abbas, Z. Pflanzenkenkr Pflangenschutz 95: 606–610, 1988; Young et al., J. Entomol. Sci., v. 20, 212–218, 1985; King et al., J. Entomol. Sci. v. 23, 394–398, 1988), parasites (Young et al., J. Entomol. Sci. v. 24, 500–506, 1989a; Young et al., Environ. Entomol, v. 19, 251–256, 1989b; Brown et al., Southwest. Entomol., v. 14, 139–146, 1989), insectivorous birds (Vyas et al., Indian J. Agric. Sci. v. 58, 661–663, 1988), honeybees (Childress et al. , Phytopathology, v. 77, 167–172, 1987), blown dust (Oloffsson, Entomol. Exp. Appl. v. 46, 181–186, 1988), and others. With autodissemination, a biocontrol agent composition can be delivered to eggs of an insect so that it is readily available to the most susceptible life stage, the neonates. Thus, much smaller quantities of the formulations are used compared with the amounts required for inundative sprays. An autodissemination technique also can be used to augment insect control programs, thus decreasing the amount of chemical insecticide used.

There are various types of prior art devices for destroying insects using insecticides and/or pheromones.

For instance, U.S. Pat. No. 4,671,010 ('010) discloses a tubular housing filled with a sex-attracting pheromone where the exterior surface of the tube is coated with an insecticide. Another device is disclosed in U.S. Pat. No. 5,042,194 where the trap chambers are coated with a contact poison. One disadvantage of these devices is that they use an insecticide which kills or incapacitates the insect that comes in contact with it. Therefore the insecticide is not disseminated to the larval population which is responsible for the majority of crop damages.

U.S. Pat. No. 4,485,582 discloses an insect feeding station wherein insects enter the station from the side or from below through an opening 34 in an extension 32. The station contains a bait which is a mixture of poison and food material to attract the insects. The insects eat the poison and then exit the station to die elsewhere. However, this has the similar disadvantage in that the insecticide is not disseminated to the larval population.

The present invention provides a safe, simple, cost effective alternative strategy for conveying biocontrol agents to specific targeted sites which is different than the insecticide containing prior art insect traps.

SUMMARY OF THE INVENTION

It is, therefore, an object of the present invention to provide a simple structure which directs insects through a biocontrol agent composition and then directs them to exit the device.

A further object of the present invention is to provide the structure with an insect trapping means which includes an insect attractant.

It is also an object of the present invention to provide a method for disseminating biocontrol agents by insects using the disclosed device.

Further objects and advantages of the invention will become apparent from the following description.

DETAILED DESCRIPTION OF THE INVENTION

Figure 1:
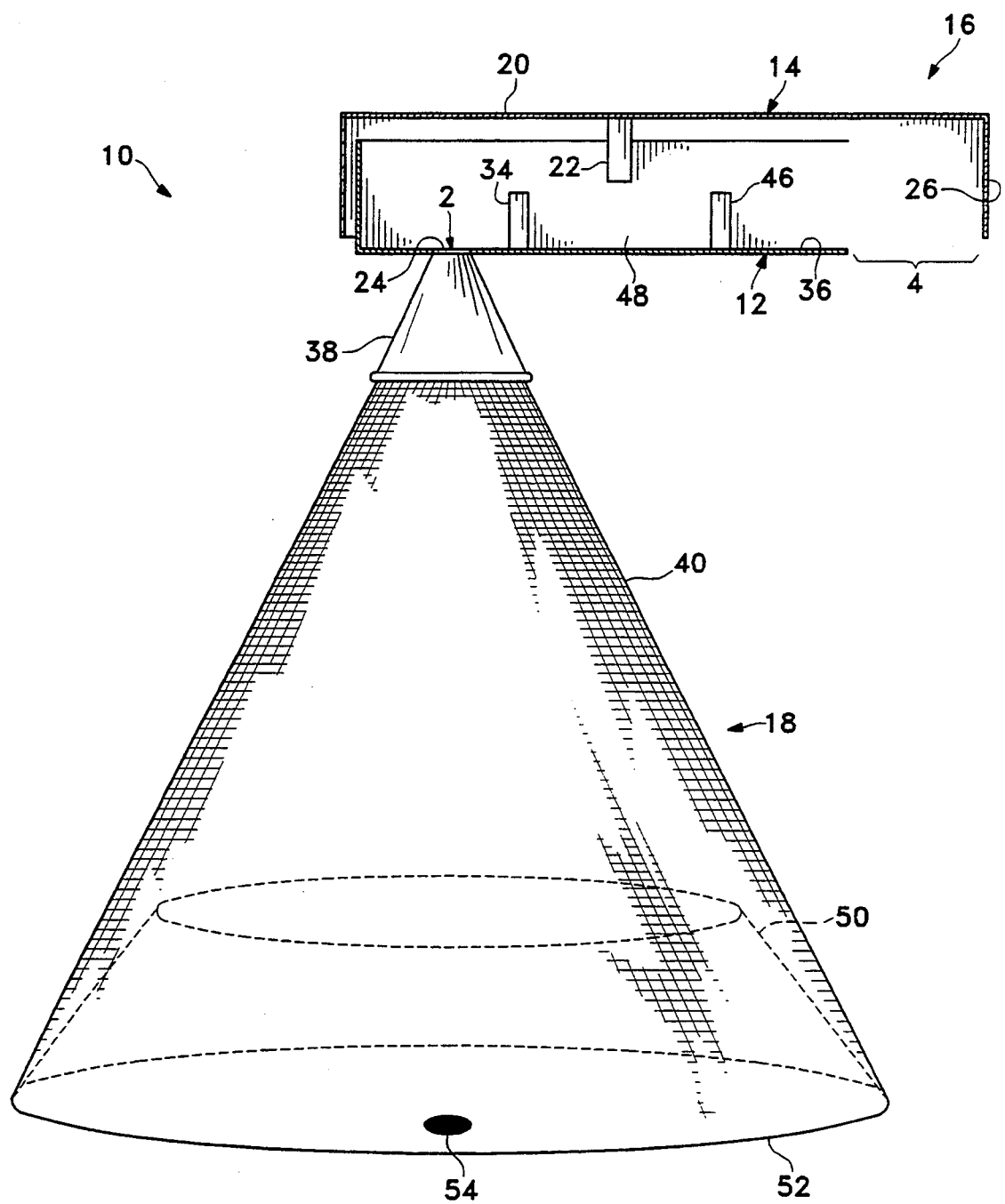
FIG. 1 shows a side view of one embodiment of the autodissemination device.

FIG. 1 shows a cross-section of the device 10 of the present invention, referred to hereafter as the autodissemination device (AD). The AD 10 (FIG. 1) has a separate entrance at base 52 of the cone-shaped trap 18 portion of AD 10 and a separate exit 4 for insects.

AD 10, as shown in FIG. 1, is made up of two primary parts: a dusting station 16 (FIG. 2) and a cone-shaped trap 18. The dusting station 16 is generally rectangular but can be of any possible shape and made of any suitable material. It is mounted on the top of the cone-shaped trap 18 (Hartstack et al. Moth Traps for the Tobacco Budworm, Journal of Economic Entomology, Volume 72 (4), 1979, incorporated herein by reference).

Figure 2:
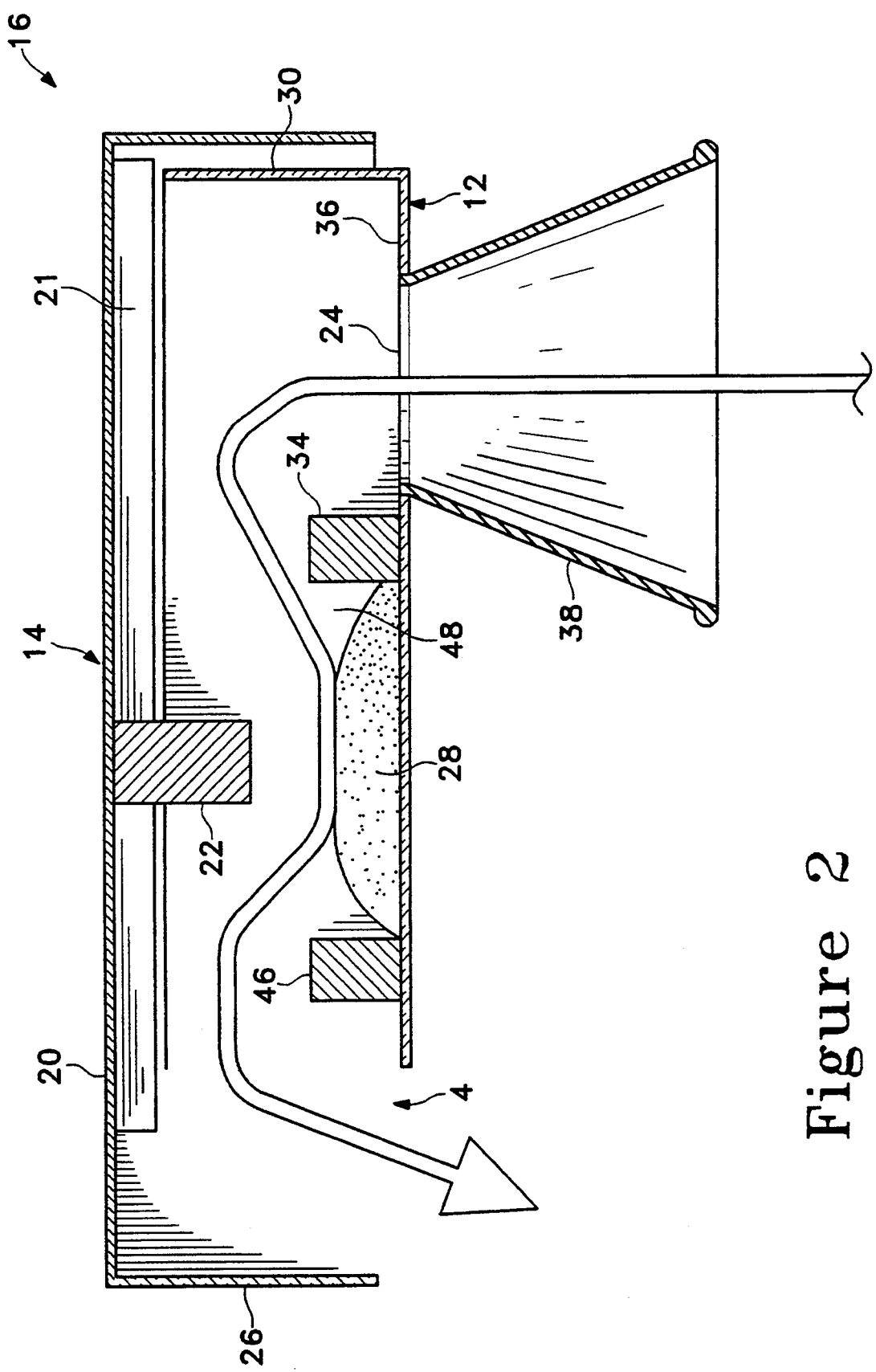
FIG. 2 shows a side-view of a cross-section of the dusting station.
Figure 3:
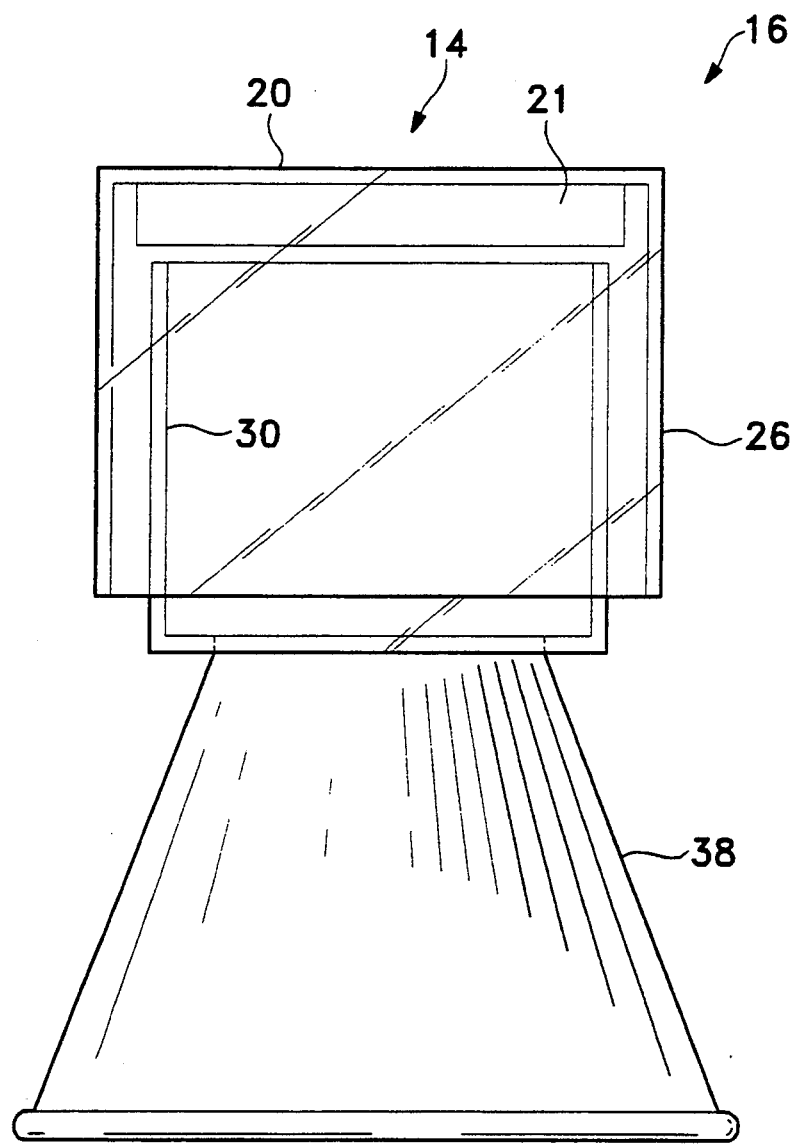
FIG. 3 shows an end view of the dusting station.
Figure 4:
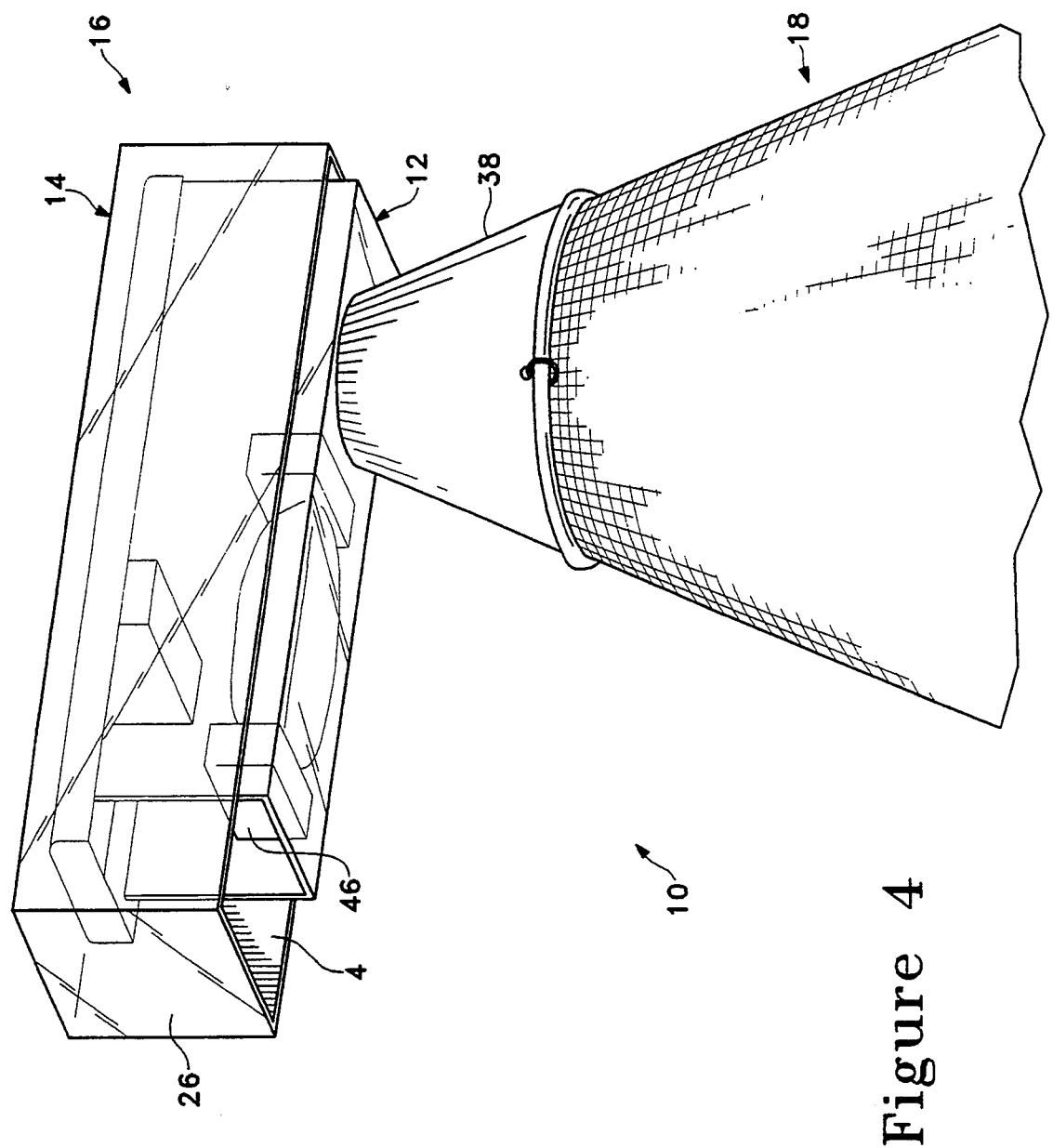
FIG. 4 shows a perspective view of the autodissemination device.

The dusting station 16 as seen in FIG. 2 includes a base portion 12 and a removable elongated cover 14. The elongated cover and base portion are generally constructed of plexiglass; however, the top inside surface and at least a top portion of the inside side surfaces of the cover are covered with an ultraviolet blocking structure such as felt 12. Connected to the inner surface of the top 20 of cover 14 is a downwardly extending baffle 22 which can be made of any suitable material. The baffle 22 extends approximately 2 cm from the top 20 of cover 14. The cover 14 extends from the base portion 12 opposite of opening 24 by at least approximately 4.0 cm in order to form the exit opening 4. The elongated cover 14 is approximately 25 cm long and extends over the three peripheral walls of base portion 12 forming outer casing walls 26. The bottom portion of cover 14 preferably remains transparent so that the biocontrol agent composition 28 can be monitored.

A first end of the base portion 12 of the dusting station 16 includes an opening 24 in floor surface 36 opposite to the second end where there is no peripheral wall (see FIG. 1). Opening 24 must be at least about 3.0 cm in diameter. Just forward of opening 24 are two parallel upwardly extending baffles 34 and 46 that are attached to the interior floor surface 36 of the base portion 12 on either side of downwardly extending baffle 22. The two upwardly extending baffles are approximately 7.5 cm apart and approximately 2 cm high. These two upwardly extending baffles form an interior reservoir 48 for containing a biocontrol agent composition 28. The smaller diameter end of cone-shaped fitting 38, which may be a funnel, extends into opening 24 cut from the floor of base portion 12. Annular fittings such as O-rings may be fitted onto the funnel on either side of the floor member 36 of base portion 12 to secure cone-shaped fitting to the floor of the base portion. Fitting 38 may optionally be heat sealed or glued to the floor of base portion 12. Attached by small wires inserted through two or three small openings in the cone-shaped fitting 38 is inverted, truncated, cone-shaped trap portion 18 of AD 10. The cone-shaped trap portion 18 of AD 10 is constructed of galvanized wire (hardwire cloth, 8×8 mesh). It has a base diameter of 75 cm and a top diameter of 4 cm. The trap 18 has an inner cone 50 of 8×8 wire mesh placed at the base of the outer cone 40 of cone-trap 18. The inner cone is flattened and has a top diameter of 50 cm and a base diameter of 75 cm. The top of the inner cone 50 is removed to create a larger opening and the rim of inner cone 50 is attached by any means, such as wiring, stapling, soldering, etc.

The trap portion 18 contains an attractant 54. The attractant is placed approximately in the center of the base 52 of outer cone 40 of cone-shaped trap 18 at approximately 5 cm below the base of the cone and is located where two support arms for the trap cross. The attractant can be any bait or pheromone for attracting an economic pest. One of ordinary skill in the art could readily determine the type of bait or pheromone to use to attract the desired insect. Furthermore, it could be any type of light source such as a black light. The AD can be readily modified in order to accommodate any size of flying insect by changing the size of the entrance and exit openings as well as the baffles. AD 10 is attached to a 1.5 m fence post with steel clamps.

In operation, the insects are drawn to the attractant located under the trap and enter the cone trap 18 through its base opening (FIG. 1). They move upward and eventually enter the dusting station 16 through opening 24 (FIG. 1 and 2). The three baffles 22, 34, and 46 force the insects to crawl through the internal reservoir 48 containing the biocontrol agent composition 28.

The biocontrol agent can be virus, bacteria, fungi, rickettsia, nematodes, eggs of predatory mites, etc. The powdered carrier can be an acceptable biocontrol agent powdered carrier such as a starch such as corn starch, talc, dust derived from crushed hulls of nuts, clay dust, or mixtures thereof. The biocontrol agent is dispersed in the powdered carrier to form a composition.

The insect then escapes the trap by crawling over baffle 46 and it falls out opening 4 (FIG. 1). Subsequent mating of the contaminated insect results ultimately in the contamination of the surface of the egg. While chewing through contaminated egg chorion during hatching, larvae ingest lethal quantities of the biocontrol agent. The AD thus provides a novel method for bringing together pest and biocontrol agent without the use of ineffective or polluting technology. The AD offers promise because it is safe, efficient, and provides selective management strategies for targeting eradication of primary pests of home gardens and commercial agriculture.

The following example illustrates testing conditions of the device and the results. It is intended only to further illustrate the invention and is not intended to limit the scope of the invention as defined by the claims.

The autodissemination technique tested used *Autographa californica* nuclear polyhedrosis virus (AcNPV). It has been demonstrated that viral-contaminated males of *Heliothis virescens* paired with uncontaminated female partners results in the transmission of substantial amounts of AcNPV to female moths (Nordin et al, Vertical Transmission of Two Baculoviruses Infections to the Tobacco Budworm, *Heliothis virescens* (F) (Lepidoptera: Noctiidae) Using an Autodissemination Technique, J. of the Kansas Entomological Society, v. 63(3), 393–398, 1990, herein incorporated by reference). This results in the contamination of eggs during oviposition, and ultimately in viral infections in the $F_1$ progeny. Studies in a greenhouse and in small cages on field-grown tobacco suggests that enough polyhedral inclusion bodies (PIBs) persists on the eggs of *H. virescens* over a three-day period after oviposition to initiate lethal infections in early instars in the field (Nordin et al, Transovum Transmission of Two Nuclear Polyhedris Viruses (Baculoviridae) by Adult Tobacco Budworm and Viral Persistence on Tobacco Foilage, Trans. Ky. Acad. Sci., v. 52(1-2) 33–39, 1990, incorporated herein by reference).

The following examples are field studies using the above described autodissemination trap.

EXAMPLE

Part A

Field sites were located on experimental farms in Oxford, N.C., and Princeton, Ky. At Oxford, field plots were randomly assigned within two blocks to treatments of: (1) nine ADs (high density) with biocontrol agent and marking powder, (2) five ADs (low density) with biocontrol agent and marking powder, (3) nine ADs (high density) without virus but with marking powder, (4) five ADs (low density) without virus but with marking powder, and (5) control plots with only corner monitor traps (MT). All plots were at least 75 m apart. Corner monitor traps (MT) had cylindrical hardware cloth baskets attached to the tops of texas-style wire cone traps (Harstack et al, 1979) to retain male moths.

At Princeton, the same arrangement was used except that the treatment of low-density ADs without virus (treatment 4 above) was eliminated because of the loss of these experimental plots from draught. See FIGS. 5 and 6 for the spatial arrangement of ADs.

Field plots at each location were approximately 0.2 hectare (ha). At Oxford, each plot consisted of two sections (37 by 25 m) separated by a grass alleyway. Plants were on 56 cm centers with 1.2 m between rows, for a total of approximately 14,700 plants per ha. All fields at Oxford were planted with 'Coker 176', a commercial flue-cured tobacco cultivar. Before transplantation, fields at oxford were treated with metalaxyl (Ridomil 2E [emulsifiable], Ciba-Geigy Corp., Greensboro N.C.; 2.34 liters/ha), and pebulate (Tillam 6E, ICI Americas, Wilmington, Del., 2.73 liters/ha) or isopropalin (Paarlan 6E, Dow-Elanco, Indianapolis, Ind.; 2.34 liters/ha) for blue mold and weed control, respectively.

The fields at Princeton were 45 m on each side, and they were planted with 'KY 171' a commercial dark-fired tobacco cultivar Plants were on 1.02 m centers with 0.91 m between rows, for a total of approximately 10,800 plants per ha. These fields were treated with pendimethalin (Prowl 4E, American Cyanamide Company, Wayne, N.J., 1.2 liter/ha) before transplantation for weed control.

Part B

Figure 5:
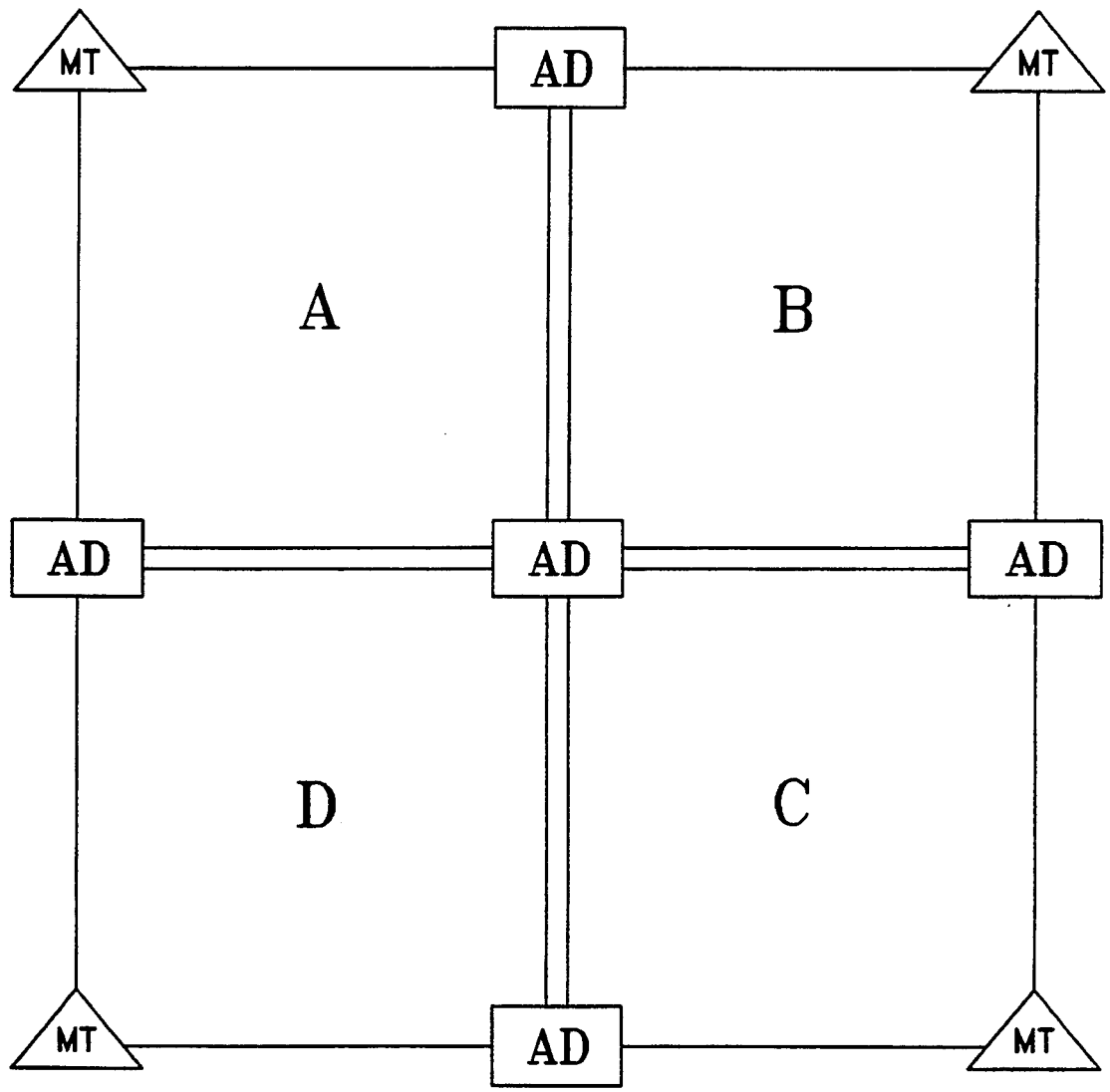
FIG. 5 shows the low density placement plan for ADs.
Figure 6:
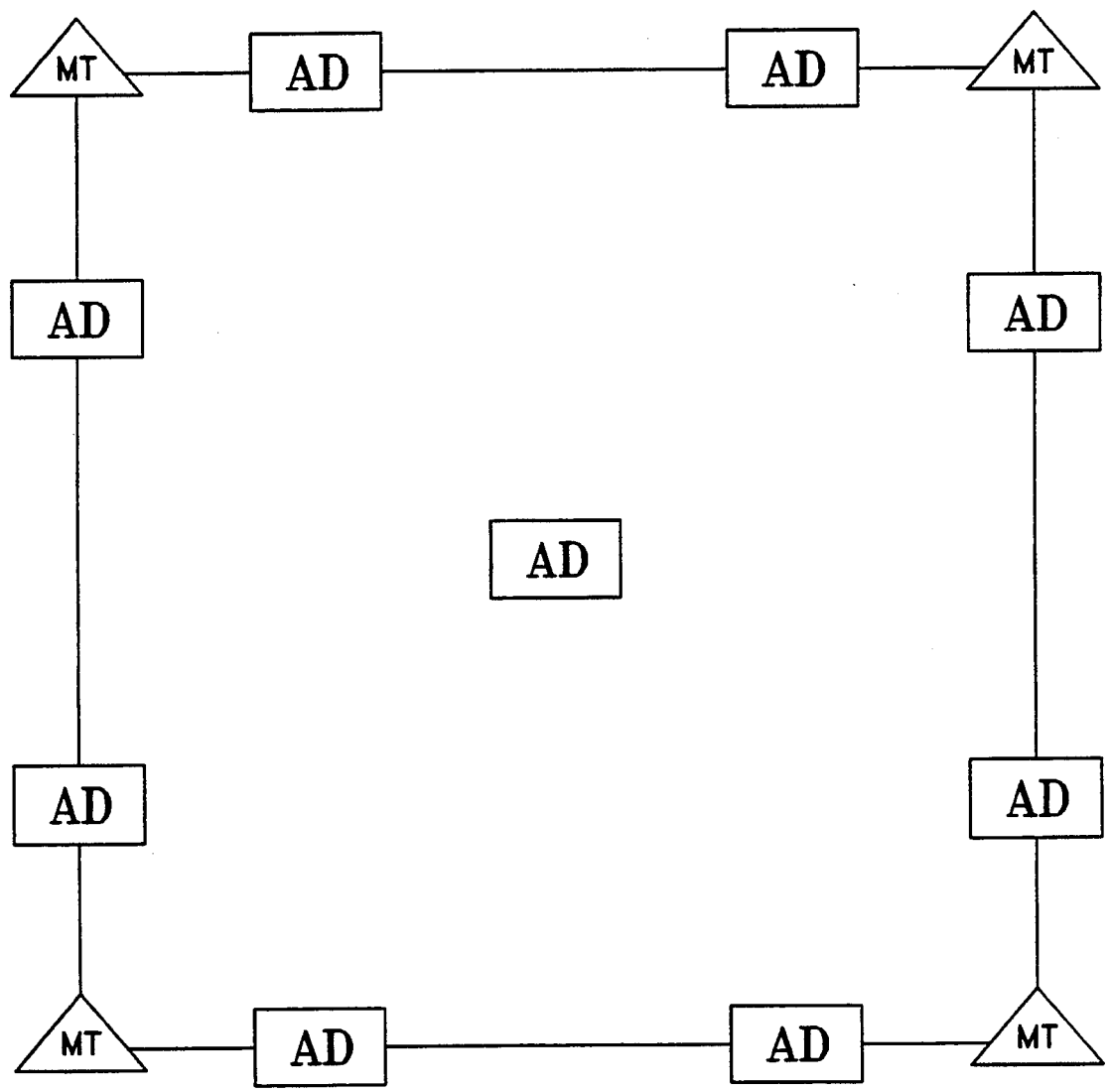
FIG. 6 shows the high density placement plan for ADs.

Autodissemination devices were placed as depicted in FIGS. 5 and 6. They were charged with 5 grams of a powder composition containing a baculovirus, *Autographa californica* nuclear polyhedrosis virus (AcNPV), walnut shell flour, and Day-Glo fluorescent marker powders (Day-Glo Color Corp., Cleveland, Ohio) at a weight:weight:weight of 1:14:65 to yield a viral density of $4.4 \times 10^{10}$ polyhedral inclusion bodies (PIBs)/gram. ADs without virus received only walnut shell flour:- marking powder at 15:65 weight ratio. Preliminary experiments indicate that some powder stuck to all moths that pass through the ADs. Different colored marker powders were used for each treatment so that dispersal of intercepted moths between plots could be assessed.

Virus and marker powders were recharged on Julian dates 159, 173, and 201 for Oxford and 217 and 232 for Princeton. All traps were bated with Virelure pheromone tabs that were replaced at 2–3 week intervals. Virelure (Scentry, Buckeye, Ariz.) is a synthetic female-produced sex attractant which attracts refractive adult male *Heliothis virescens*.

Part C

In order to measure net transmission of AcNPV to larvae of *H. virescens* onto tobacco plants, plots were divided into quadrants. Twenty-four eggs were sampled per quadrant during a 15-minute period. Egg sampling was conducted three times weekly on Mondays, Wednesdays, and Fridays. Eggs were placed individually into cells of 24-well tissue culture dishes partially filled with synthetic diet (Yearian et al, Rearing the Fall Webworm *Hyphantria cunea* Dr. (Lepidoptera: Aratiidae) on a Wheat Germ Medium, J. Kans. Entomol. Soc. 39:495–499, 1966, incorporated herein by reference).

Larval mortality was observed over a two-week period. Tissue samples from cadavers were examined by light microscopy for evidence of AcNPV infections. Table 1 shows data collected during one growing season.

TABLE 1

SEASONAL TOTALS OF HELIOTHIS EGGS TREADED WITH AcNPV AND AcNPV-INDUCED MORTALITY AD OXFORD, NORTH CAROLINA AND PRINCETON, KENTUCKY

| Location | Treatment[a] | # Eggs Collected | # Eggs That Hatched | % Eggs Contaminated with AcNPV[b] | % AcNPV-Induced Larval Mortality[c] |
|---|---|---|---|---|---|
| Oxford | AcNPV treated & high-density | 97 | 67 | — | 11.9 |
| | AcNPV treated & low-density | 46 | 38 | — | 7.9 |
| | No AcNPV & high-density | 30 | 22 | — | 4.6 |
| | No AcNPV & low-density | 11 | 6 | — | 0.0 |
| | Control | 27 | 21 | — | 4.8 |
| Princeton | AcNPV treated & high-density | 1,170 | 711 | 7.8 | 11.1 |
| | AcNPV treated & low-density | 1,284 | 777 | 6.7 | 8.3 |
| | No AcNPV & high-density | 1,277 | 698 | 3.4 | 3.3 |
| | Control | 1,191 | 650 | 0.0 | 2.3 |

[a]Each treatment was replicated twice.
[b]Determined by SEM.
[c]Determined by bioassays of the eggs.

It shows number of eggs collected, eggs that hatched, eggs contaminated with viral PIBs, and larvae mortality induced by AcNPV. Levels of AcNPV-induced larval mortality were detectable from eggs collected at both sites, indicating that the autodissemination technique functions.

At Princeton, there was little difference between high- and low density treatments in percentages of eggs contaminated by AcNPV (Table 1), suggesting that the autodissemination technique was not greatly limited by densities of ADs. There was only a slight difference in percentages of AcNPV-induced larval mortality between high-and low-density treatments.

There was a tendency for high-density plots to reflect greater AcNPV-induced larval mortality than low-density plots at Princeton. This trend is particularly true early in the season.

There was relatively little difference between egg contamination rates (so determined by SEM) and larval infection rates at Princeton. It was expected that at least some virus would be inactivated by ultraviolet light and some virus would be dislodged from eggs in the field. Therefore, it was predicted that the percentage of larval mortality would be less than the percentage of eggs contaminated with AcNPV. However, this was not the case for the Princeton data. Season-long percentages of larval mortality were higher than season-long percentages of egg contamination for all AcNPV treatments (Table 1). Also on 13 of 21 dates, when both SEM and bioassay data were collected, the percentage of larval mortality induced by AcNPV was higher than the percentage of eggs contaminated with AcNPV. However, this apparent higher larval mortality was probably from sampling variation or experimental error because the only biological explanations for this phenomenon are horizontal transmission of AcNPV or "cycling" of the virus in the pest population. These explanations are unlikely because only eggs were collected for bioassay and because AcNPV is not found naturally in *H. virescens* populations.

The number of larvae that died from AcNPV in each instar were 95 (first instar), 72 (second instar), 25 (third instar), 5 (fourth instar), and 0 (fifth instar). All larvae were individually reared from field-collected eggs, so larvae could only have become infected as they hatched. If there is no horizontal transmission, this distribution would be similar to the age distribution of dead larvae found in the field. During our field searches for eggs, many AcNPV-killed fourth and fifth instars were found. From the data collected from field-collected eggs, these larvae probably were not infected as first instars. Consequently, some horizontal transmission apparently occurred. Much horizontal transmission probably occurs because *H. virescens* larvae are cannibalistic and attack dead and dying larvae infected with AcNPV (unpublished data). Therefore, the sampling technique used probably underestimates the effectiveness of the ADs for suppressing tobacco budworm larvae in the field.

Part D

The experimental plan of Part A was repeated during a second growing season at both sites. However, evaluation of the results from the first season led to modifications in the design for the second season. The changes were the use of only the high-density ADs; the use of three rather than two replicates per treatment, and the use of larger (75×50 cm) texas-style cone traps (Harstack et al, J. Econ. Entomol., v. 72, 519-522, 1978) to increase trap efficiency, placement of the Virelure tabs 5 cm below the rim of the support cone to further improve trap efficiency, placement of four flowering tobacco plants at the center of each quadrant to concentrate early season oviposition by *H. virescens* females; use of 5 minute rather than 15 minute sampling periods for collection of eggs on tobacco leaves within each quadrant, a change in sampling schedules whereby egg sampling occurred on Mondays and Thursdays, and the transfer of all sampled eggs to plastic cups (28 ml) each containing 10 ml of synthetic media. Virus and marking powders were recharged on Julian dates 167, 186, 195, 208 and 227 at Oxford and 198, 209, 222, and 236 at Princeton.

There was an increase in the number of eggs collected in 1989 at Oxford due to the difference in sampling methods and an overall higher *H. virescens* population. The technique of placing flowering plants in the Oxford plots to concentrate eggs was beneficial as shown by the higher number of eggs. See Table 2. During this season the relatively high levels of larval mortality found in the first season was not repeated. The data in Table 2 resemble the results of the first seasons low-density plots at least in their magnitude.

TABLE 2

SEASONAL TOTALS OF HELIOTHIS EGGS TREADED WITH AcNPV AND AcNPV-INDUCED MORTALITY AD OXFORD, NORTH CAROLINA AND PRINCETON, KENTUCKY

| Location | Treatment[a] | # Eggs Collected | # Eggs That Hatched | % Eggs Contaminated with AcNPV[b] | % AcNPV-Induced Larval Mortality[c] |
|---|---|---|---|---|---|
| Oxford | AcNPV treated & high-density | 97 | 67 | — | 11.9 |
| | No AcNPV & high-density | 30 | 22 | — | 4.6 |
| | Control | 27 | 21 | — | 4.8 |
| Princeton | AcNPV treated & high-density | 1,170 | 711 | 7.8 | 11.1 |
| | No AcNPV & high-density | 1,277 | 698 | 3.4 | 3.3 |
| | Control | 1,191 | 650 | 0.0 | 2.3 |

[a]Treatments were replicated three times.
[b]Determined by SEM.
[c]Determined by bioassays of the eggs.
AcNPV, Autographa californica NPV.

There was relatively little difference between egg contamination rates and larval infection rates at Princeton for both seasons (Table 1 and 2).

Some problems associated with this study were that the plots were too small and too close together relative to the dispersal of *H. virescens* moths. Many males probably left the fields where they were contaminated and many uncontaminated males probably came in from untreated areas. At both sites, treatment plots were interspersed with other tobacco fields used for other research projects. Flowering tobacco in adjacent untreated fields attracts females for oviposition. This was shown at Princeton by a higher distribution of *H. virescens* eggs on the plot sides bordering fields with flowering plants. Male and female moths are also attracted to flowering tobacco as a nectar source. Because the plots at Oxford were kept free of flowering tobacco, moths may have moved out of the fields into fields with more flowers. This explains the low infection rate.

The occurrence of *H. zea* eggs within treatment plots introduces another source of error in estimating percentages of AcNPV-killed larvae. Larvae of *H. zea* are much less susceptible to AcNPV infection than are larvae of *H. virescens*. High percentages of *H. zea* found at Oxford during the second growing season may have occurred because female *H. zea* moths were attracted to the early flowering plants when few alternate hosts were available in the area. Numerically, the effect of *H. zea* at Oxford was small because few moths of either species were present at the time. The percentage of *H. zea* at Princeton during the second growing season peaked at 20% late in the season. Therefore, the percentage of AcNPV-induced larval mortality at Princeton may have been underestimated.

Although viral mortality rates were low, it can be seen that the ADs works by lethally infecting destructive larvae. This technique could be used to augment conventional pest control. The design is relatively inexpensive and easily maintained. Moreover, traps placed at the field edge do not interfere with other field operations or pest control techniques. This technique could easily be implemented in areas with organized pest management programs and would decrease the amount of chemical insecticides introduced into the environment.

The foregoing detailed description is for the purpose of illustration. Such detail is solely for that purpose and those skilled in the art can make variations therein without departing from the spirit and scope of the invention.

INDEX OF ELEMENTS DESIGNATED BY A NUMERAL

2. Entrance
4. Exit
10. Autodissemination Device
12. Base of Dusting Station
14. Removable Cover
16. Dusting Station
18. Cone-Shaped Trap
20. Top of Cover
21. Liner
22. Downwardly Extending Baffle
24. Opening
26. Outer Casing Walls of Cover
28. Biocontrol Agent Composition
30. Base Peripheral Wall
34. Upwardly Extending Baffle
36. Interior Floor Surface
38. Cone-Shaped Fitting
40. Outer Cone
46. Upwardly Extending Baffle
48. Internal Reservoir
50. Inner Cone
52. Base of Outer Cone
54. Attractant

We claim:

1. An autodissemination dusting station comprising
   a structure having an inner base portion which includes a floor and three peripheral walls and an outer removable cover portion which includes a top and outer casing walls wherein said cover walls extend over said base walls;
   a divider means which forms a reservoir for a biocontrol agent composition and directs flying insects through said composition; and
   a fitting means for attaching said station to a means for trapping insects wherein said fitting means extends into an opening in said floor of said base portion.

2. The dusting station of claim 1 wherein said divider means comprise a downwardly extending baffle structure attached to the interior of the top of said cover and two upwardly extending baffle structures located on either side of said downwardly extending baffle and attached to said floor of said base portion.

3. The dusting station of claim 1 further comprising a separate entrance and a separate exit wherein said entrance is through said fitting means and said exit located on the side of said base structure without a peripheral wall opposite from said entrance.

4. The dusting station of claim 1 wherein said reservoir contains a composition comprising a biocontrol agent and an acceptable biocontrol agent powdered carrier.

5. An autodissemination device comprising the dusting station of claim 4 and a means for trapping flying insects.

6. The device of claim 5 wherein said means for trapping includes a cone-shaped trap.

7. The device of claim 6 further comprising an insect attracting bait.

8. A method for autodissemination of a biocontrol agent to plants by flying insects comprising
   locating the autodissemination device of claim 6 in a vicinity of plants,
   attracting flying insects into said device,
   directing said insects through a biocontrol agent composition, and
   allowing said insects to exit said device to deliver said biocontrol agent to its targeted pest.

9. An autodissemination device comprising the dusting station of claim 1 and a means for trapping flying insects.

10. The device of claim 9 wherein said means for trapping includes a cone-shaped trap.

11. The device of claim 9 further comprising an insect attracting bait.

* * * * *